United States Patent Office 3,412,272
Patented Nov. 19, 1968

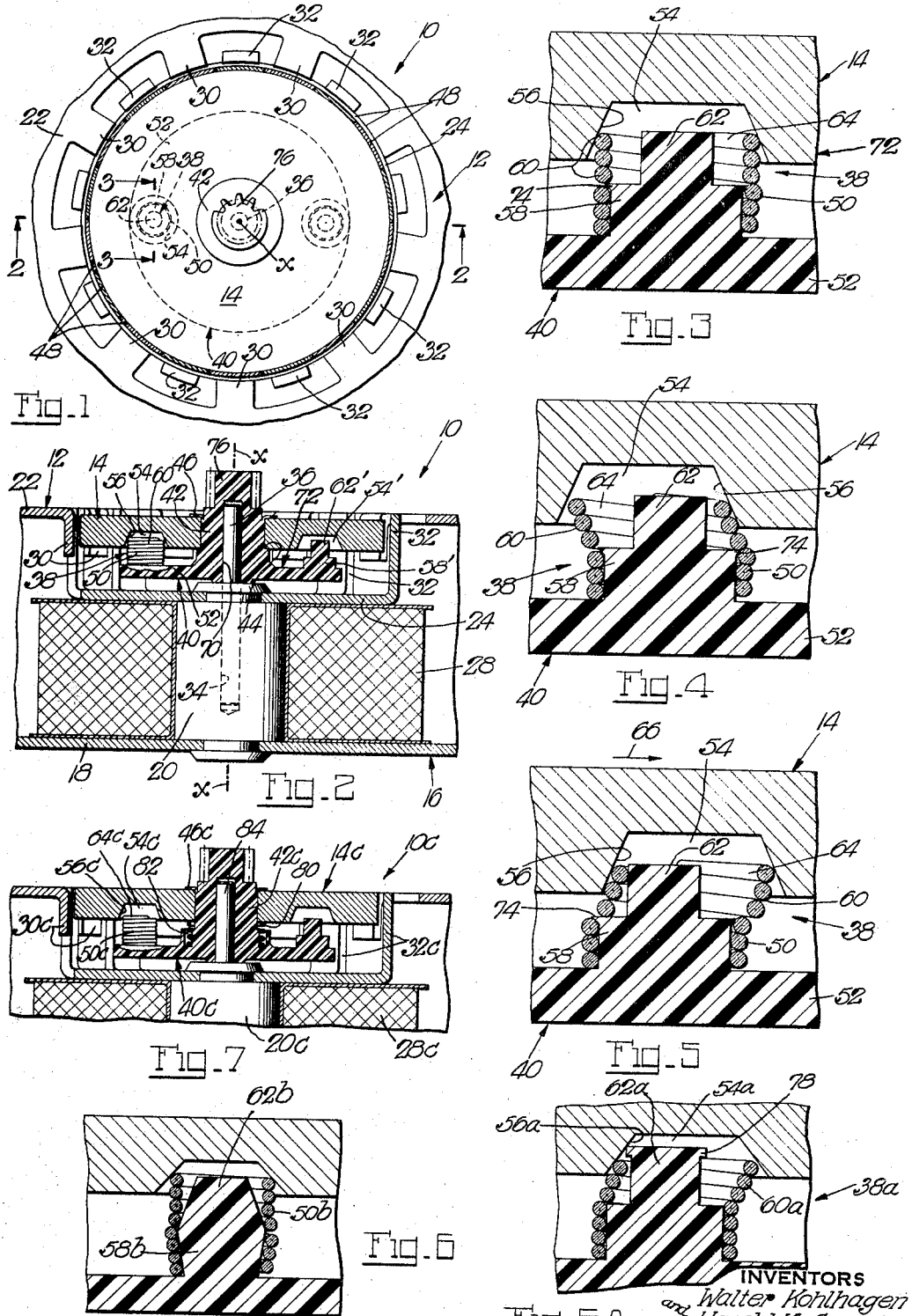

3,412,272
SELF-STARTING SYNCHRONOUS
REACTION MOTOR
Walter Kohlhagen, Elgin, Ill., and Harold K. Cummings,
Whitewater, Wis., assignors to Amphenol Corporation,
Broadview, Ill., a corporation of Delaware
Filed May 17, 1966, Ser. No. 550,761
20 Claims. (Cl. 310—164)

This invention relates to synchronous motors in general, and to self-starting synchronous reaction motors in particular.

Motors of this type have a multipolar field of which alternate poles are of opposite polarity at any instant and change their polarities in phase with an alternating current supplied to the associated field coil, and a permanent-magnet rotor the poles of which cooperate with the field poles in driving the rotor in synchronism with the alternation of the current. These motors are in principle self-starting by reaction between the rotor poles and associated field poles, with the rotor responding in characteristic angular vibration to initial polarity changes of the field poles until sufficiently unstable to take off in either direction in which it has a predominant urge to go. However, motor load and other factors frequently deprive the rotor of the necessary freedom to respond to initial polarity changes of the field poles, with the result that the rotor will remain hung-up in its idle position and thus fail to start.

In attempting to eliminate, or at least greatly reduce, starting failure of these motors, various expediencies have been resorted to among which is resiliency in the rotor drive by providing any of various coupling springs between the rotor shaft and the loose rotor thereon. However, while these coupling springs do succeed in reducing motor starting failure, they also have some drawbacks. Thus, these prior coupling springs, being mostly of leaf-type and called upon to transmit the entire driving torque to the motor load at any instant, are for adequate strength necessarily of a size which is relatively large in comparison to the rotor, and their connections with the rotor and its shaft must be positive and sufficiently firm for the purpose which makes for rather tedious assembly of these parts considering the small sizes of rotors and especially their shafts in by far the greater majority of motors for clock and many other timing purposes, wherefore their provision in motors becomes a cost factor which is substantial in any event. Further, by virtue of their size and sole rotor torque transmission to the motor load, the operational deflection of these coupling springs is necessarily considerable and may give rise to spring-induced hunting of heavier motor loads with sudden changes in magnitude, which is undesirable not only where uniformity of the load drive is a prime requirement as in some applications, but also because it may have an adverse effect on the in-phase drive of the rotor. Moreover, if these prior coupling springs are used in conjunction with the advantageous axial rotor starting vibration disclosed in the copending application of Walter Kohlhagen, Ser. No. 396,204, filed Sept. 14, 1964, now U.S. Patent 3,333,129, their considerable inertia owing to size may, on their subjection to axial rotor vibration and response thereto in even simple flexure for edging the rotor into an angular start, dampen such rotor vibration sufficiently to sacrifice some of the starting benefit derived therefrom.

It is the primary aim and object of the present invention to provide in a motor of this type a rotor-to-shaft spring coupling which has none of the aforementioned drawbacks of prior spring couplings.

It is another object of the present invention to provide in a motor of this type a rotor-to-shaft spring coupling which is considerably more resilient in operation than prior spring couplings in any event, and which is in fact so highly resilient that it will to all practical intents have no restraining effect on the characteristic initial vibratory starting phase of the rotor about its axis, and will on angular starting displacement of the rotor from repose position apply the motor load so exceedingly gradual that the load will be no effective impediment to the rotor's continued angular progress to the end of its starting phase, yet it will unfailingly transmit the full torque for the drive of any, and even the heaviest, motor load. This is achieved, in the first place by using a helical spring, and in the second place by providing for free relative rotation between the rotor and shaft over a limited range and applying the spring to the rotor and shaft so that its operational deflection is laterally of its axis at which the ensuing resilient torsion therein is particularly low over the free-motion range of the rotor and shaft within which the rotor will readily reach the end of its final starting phase in angular motion, with the rotor being at the end of its free-motion range directly and positively coupled to the shaft for transmitting the driving torque without further participation of the spring if the motor load is sufficiently heavy to require this.

It is a further object of the present invention to provide in a motor of this type a rotor-to-shaft spring coupling of the aforementioned helical spring type which is of particularly simple-construction and low cost, by arranging the spring with its axis spaced from and parallel with the shaft axis, and anchoring the same with an endlength thereof on one of the rotor and shaft parts, preferably on the shaft through intermediation of an arm thereon, so as to leave the spring with a free or active length to its other end which is received substantially fittingly in a recess in the rotor, and providing on the shaft arm a post which extends into the rotor recess as well as within and substantially coaxial with the active spring length with clearance therefrom. With this arrangement, the free-motion range between the rotor and shaft is advantageously provided by the rotor recess and the post in the spring, with the active spring length being by the wall of the rotor recess compelled into the aforementioned operational deflection, and the free motion range is preferably and conveniently made equal to the clearance between this spring length and the post therein by providing for their operational engagement with each other within the rotor recess when this spring length at its maximum deflection is clamped between the post and the wall of the rotor recess on either side thereof to define either end of the free-motion range.

Another object of the present invention is to provide a motor of this type in which the aforementioned post on the shaft arm advantageously serves also as the sole mount for the spring, by making this post over its length within the axial confines of the anchored endlength of the spring of a diameter sufficiently larger than that of the spring to have the latter on its mere axial passage onto this post length in sufficiently tight fit therewith for the purpose, whereby the simplicity of construction and assembly of the spring coupling are further enhanced and its cost still further reduced.

A further object of the present invention is to provide a motor of this type in which the aforementioned spring-anchoring post length has at its free end an outwardly projecting lip which may conveniently be formed peripherally uninterrupted and serves with particular firmness against axial strip-off of the spring from the post from any cause.

It is another object of the present invention to provide a motor of this type in which at least the active length of the helical spring of the rotor-to-shaft coupling is preferably and conveniently cylindrical or substantially cylindrical, and the recess in the rotor is preferably and conveniently formed frusto-conical. With this arrangement, substantially fitted reception of the active spring length in the rotor recess is readily achieved despite tolerances in size or shape of the parts involved and, even more important, only the endmost turn of the active spring length is engaged by the frusto-conical wall of the rotor recess throughout operational spring deflection so that all turns of this spring length equally participate in the spring deflection, with the ensuing torsion in each of these spring turns being substantially equal and far from causing permanent distortion of any part of the spring, whereby the spring will not only have an exceptionally long useful life but also retain its high resiliency for the longest time.

It is a further object of the present invention to provide a motor of this type in which the helical spring of the rotor-to-shaft coupling is wound with its turns preferably in engagement with each other. This is of advantage, in that the spring may be made from fine-gauge wire of high resiliency, yet have adequate strength to recover from deflection and back the rotor from the motor load when the motor stops, and the mount of the spring on its post is also of optimum firmness.

Another object of the present invention is to provide a motor of this type in which the present rotor-to-shaft spring coupling may be used advantageously in conjunction with the aforementioned initial axial rotor vibration phase of a rotor start. The attainment of this initial rotor starting phase requires axial shiftability of the rotor on its shaft and a spring which normally shifts the rotor axially out of full register with the field poles, with the spring and polar magnetic forces cooperating, on field reexcitation after a rotor stop, to set the rotor into axial vibration into and from full register with the field poles substantially at the frequency of the applied AC, and the spring being of a strength to be overpowered by the polar magnetic forces when the rotor has succeeded in starting and steps in phase with the applied current so that the rotor will run in full axial register with the field poles for optimum torque generation. In applying the present rotor-to-shaft spring coupling to this motor, the rotor recess is preferably of the aforementioned frusto-conical shape, and the coupling spring and post therein are arranged so that both will project into the rotor recess in all axial rotor positions but the spring will engage the wall of the rotor recess only when the rotor is somewhat out of, or substantially in, full register with the field poles for performing its designated function. With this arrangement, the aforementioned free-motion range of the motor and shaft, as well as the assembly of the rotor, shaft and coupling parts, are kept intact in all axial rotor positions, and even more important, the rotor will, in its initial starting phase of axial vibration and on its ensuing multitudinous and extremely rapid magnetic pulls into full register with the field poles, having bouncing impacts with this spring with resulting edging of the rotor with particular urgency into angular displacement, for these rotor impacts with the spring will almost invariably occur on one side or the other of the conical wall of the rotor recess owing to the helix of the end turn of the active spring length and the rotor's freedom to turn in either direction within the free-motion range when out of engagement with the spring in axial starting vibration. Also, with this arrangement which is fully effective in its designated function, yet except for its bouncing impacts with the rotor in the latter's initial axial-vibration starting phase is during this phase physically separated from the rotor and, hence, in no wise hampers the fullest exertion of the axial starting vibration of the rotor.

It is another object of the present invention to provide a motor of this type in which the spring-carrying arm of the rotor-to-shaft spring coupling is advantageously the part on which the rotor is turnably mounted and on which the same is also held either against any axial motion or for limited axial motion, depending on whether arrangements are made for a rotor start with or without axial rotor vibration, with the arm being either pressfitted onto a rotary or live shaft or journalled on a dead shaft. To this end, the arm is preferably formed as a disc for dynamic balance and provided with a central hub on which the rotor is mounted and which, in turn, is mounted on a shaft, with the arm being preferably a plastic-molded part formed advantageously with an integral drive pinion on the hub regardless of whether this molded part is mounted on a live or dead shaft. With this arrangement, the rotor, arm and coupling spring may advantageously be preassembled into an inseparable unit which on its mount on a shaft accurately and unfailingly performs its resilient coupling function despite tolerances in its shaft mount. Moreover, the provision of the molded part, and its facile assembly with the rotor and mount on a shaft especially when these parts are quite small, afford a quite considerable costwise advantage. Also, the use of the molded part makes for noiseless performance of the spring coupling.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary top view of a motor embodying the present invention;

FIG. 2 is a fragmentary section through the motor taken substantially on the line 2—2 of FIG. 1;

FIG. 3 is an enlarged fragmentary section through the motor as taken on the line 3—3 of FIG. 1;

FIGS. 4 and 5 are sections similar to FIG. 3 and show certain motor parts in different operating positions;

FIG. 5A is an enlarged fragmentary section through a motor embodying the invention in a modified manner;

FIG. 6 is an enlarged fragmentary section through a motor embodying the invention in another modified manner; and FIG. 7 is a fragmentary section through a motor embodying the invention in a further modified manner.

Referring to the drawings, and more particularly to FIGS. 1 and 2 thereof, the reference numeral 10 designates a synchronous motor having a field 12 and a rotor 14. The field 12 comprises, in this instance, a conventional field cup 16 to the bottom 18 of which is secured a center core 20, and outer and inner field parts or plates 22 and 24 which are suitably secured to the top of the field cup 16 and to the free end of the center core 20, respectively. Received in the field cup 16 and surrounding the center core 20 therein is a field coil 28. The outer and inner field plates 22 and 24 are provided with sets of inner and outer field poles 30 and 32, respectively, which are arranged circularly about a rotor axis $x$ and of which successive poles of one set alternate with successive poles of the other set in conventional manner.

Provided in the center core 20 is a preferably lubricated bearing 34 for a shaft 36 on which the rotor 14 is turnably mounted and with which it is operatively connected by a spring coupling 38 to be described. More particularly, the rotor 14 is in this example turnable on an element 40 of the spring coupling 38 which is fast on the shaft 36, with the rotor 14 being journalled on a hub 42 of the coupling element 40 and held against axial displacement thereon by spaced shoulders 44 and 46 thereof. The rotor 14, which is a permanent magnet with two series of poles or pole faces 48 of opposite polarities, may be entirely conventional. For the sake of clarity, the pole faces 48 are shown in FIG. 1 as sectioned peripheral parts of the rotor 14.

The rotor-to-shaft spring coupling 38, which embodies the present invention, features as the coupling spring element a helical spring 50 which in operation is deflected laterally of its axis. Basic in the coordination of the spring 50 with the shaft and rotor parts 36 and 14 is its mount on one of these parts with its axis spaced from and parallel to the rotor axis x and having a free or active length which projects between spaced shoulders on the other part that deflect this spring length on relative rotation between the rotor and shaft parts. The spring coupling 38 further includes a limited free-motion range between the rotor and shaft parts within which operational spring deflection will occur and at either end of which the spring is at maximum deflection and the rotor drive of the shaft is direct and positive.

The spring 50 is in the present example carried by the shaft part 36, and to this end is mounted on an arm 52 on the shaft 36, while the spaced shoulders are provided on the rotor part 14 in the preferred form of a recess 54 therein having an annular wall 56. The spring-mounting arm 52 is in this instance a part of the coupling element 40 in the preferred form of a disc which is concentric with the hub part 42 thereof, and has for its spring-mounting provision a post 58 (FIG. 3) which is of sufficiently larger diameter than the exemplary helical spring 50 that the axially applied endlength of the spring thereon is mounted with adequate firmness, with the free or active spring length 60 projecting beyond the post 58 so as to be free for operational deflection throughout its length (FIGS. 4 and 5). The active spring length 60, which projects into the rotor recess 54, is in this instance also in engagement with the recess wall 56, and the latter is preferably frusto-conical and advantageously engaged only by the endmost turn of the active spring length in the recess 54, with this active spring length being preferably substantially relaxed for optimum resiliency in operational deflection.

The aforementioned limited free-motion range between rotor and shaft may be provided in any suitable manner. Preferably and advantageously, this free-motion range is provided by the described parts of the spring coupling 38 without any change whatsoever, and on mere additional provision of a stud 62 on the coupling element 40. The stud 62 is in this instance in the preferred form of a diametrically reduced shank extension on and coaxial with the post 58 (FIG. 3) which extends into the rotor recess 54 as well as within the active spring length 60 with equal clearance therefrom. Thus, the shank extension 62, rotor recess 54 and in this instance also the active spring length 60 and more particularly its endmost turn 64, establish the free-motion range between rotor and shaft, with either end of the free-motion range being reached on relative rotation between rotor and shaft in either direction and ensuing operational deflection of the active spring length to its maximum permissible extent at which its endmost turn 64 is also engaged by the shank extension 62 and then simply acts as a solid link between the latter and the wall 56 of the rotor recess 54. Thus, on an exemplary start of the rotor 14 in the direction of the arrow 66 (FIG. 5) and ensuing operational deflection of the active spring length 60 to the maximum permissible extent, the endmost spring turn 64 solidly links the rotor recess wall 56 with the shank extension 62, and hence the rotor with the shaft, for the continued load drive of the shaft in the direction of the arrow 66 (FIG. 5). The exemplary free-motion range thus established is in this example substantially equal to the total clearance between the active spring length 60 and the shank extension 62 therein on opposite sides of the latter.

In operation of the motor, alternating current is supplied to the field coil 28, producing in the field poles 30 and 32 opposite instantaneous polarities which change in phase with the applied current, with the pole faces 48 of the rotor 14 cooperating with the field poles 30 and 32 in driving the rotor in synchronism with the alternation of the current. To start the motor after a stop thereof, the rotor 14 will on reenergization of the field coil 28 pass through a starting phase and take off in either direction, with the rotor being on a wrong-directional start reversed into the correct drive direction by a usually provided directional drive control (not shown) of which an exemplary type provides a stop from which a rotor-driven element rebounds on a wrong-directional start and thereby reverses the entire motor drive, including the rotor, and against which a spring-urged motor load is backed in idle motor condition whereby the spring coupling 38, and more particularly the spring 50 thereof, is without impediment in shifting the rotor 14 midway of its described free-motion range on a motor stop (FIG. 3). The idle rotor 14 is thus always midway of the free-motion range regardless of whether the motor load is or is not spring-backed on a motor stop, and the rotor has in this idle position optimum freedom to respond on coil reenergization to the polar magnetic forces which compel it through its starting phase. Thus, with the rotor 14 idle as in FIGS. 1 and 3 in which the rotor pole faces 48 of exemplary equal width throughout are in alignment with the field poles 30 and 32, the magnet forces of the field and rotor poles, i.e., the polar magnetic forces, which are generated on coil reenergization will have a highly exciting effect on the rotor in responding lively vibration about its axis as the initial starting phase, with the rotor soon becoming highly unstable and taking off with a predominant and usually overpowering urgency in either direction as the next and final starting phase from which it will virtually always step into phase with the applied current and develop full driving torque to assume the motor load. While the rotor 14 will far more often than not pass through its described starting phases even though the rotor pole faces 48 are of exemplary equal width, its initial starting phase and urgency into its final starting phase are far more powerful if recourse is had to the well-known expediency of providing for widthwise unbalance between the rotor pole faces, in which case the self-starting reliability of the rotor is greatly enhanced. It is, of course, entirely feasible and also preferable to arrange the pole faces of the rotor with such widthwise unbalance, although they are exemplarily shown without any unbalance to demonstrate that even in this least favorable pole face arrangement for a rotor start the present spring coupling not only does not impede the rotor's self-start but even assists the same in overcoming adverse load factors which, of course, would also be true if the rotor pole faces were unbalanced. Thus, with the active length 60 of the coupling spring 50 being substantially relaxed in any rotor idle position (FIG. 3), the same does not impede the initial, vibratory, starting phase of the rotor, for operational deflection of the spring under vibratory impulses from the rotor is then exceedingly small and, the ensuing torsion in the turns of the active spring length is then, as well as throughout the permissible spring deflection range, inherently particularly small owing to both, the helical type of the spring and its operational deflection laterally of its axis. In fact, the ready yield of the highly resilient active spring length 60 to initial rotor vibration, rather than impeding the latter, will even render this spring length resonant with the vibrating rotor. Accordingly, the coupling spring will during the important initial vibratory starting phase of the rotor neither transmit any part of the motor load to the rotor, nor itself in any way impede starting vibration of the rotor, wherefore the rotor is truly without any impediment in this phase of its self-start and given every opportunity for optimum vigorous vibratory response to the polar magnetic forces. Further, the coupling spring will also not in the least interfere with the vibrating rotor's increasing and finally predominant urge to take off into and through its final starting phase. Thus, while the rotor may in this final starting phase even advance to the exemplary position in FIG. 4, the ensuing deflection of the active spring length 60, while relatively extensive as shown, nevertheless subjects this spring length to very little torsion and, hence, does not effectively counteract the rotor's strong urgency into and beyond the exemplary position in FIG. 4. Moreover, while the coupling spring will in this exemplary final starting phase transmit part of the motor load to the rotor, the very high resiliency of this spring will then transmit not only a minute part of the motor load, but will transmit the same even exceedingly gradually, so much so that the motor load is without any influence on this final starting phase of the rotor. Still, if for any reason the rotor should in its final starting phase hesitate, even on very rare occasions in relatively wide displacement from its repose position, as in the position in FIG. 4, for example, the rotor will in its hesitation be highly unstable at which even the very small resilient force of the spring at any operational deflection will have a decisive effect on the rotor in urging it out of its hesitation. Thus, the important beneficial effects of the coupling spring are practical elimination of the motor load, no matter how heavy, in the rotor's starting phase, and the subjection of the rotor in its starting phase, in addition to magnetic forces, also to varying spring resiliency which, though very small and advantageously so for load factor elimination in the starting phase, nevertheless adds appreciably to the rotor disturbing forces which urge the motor through its starting phase, and even assists the rotor in overcoming rare hesitation or even avoiding hesitation. Yet, the coupling spring accomplishes this on operational deflection within a very small free-motion range of the rotor and shaft. Thus, it will be noted from FIGS. 1, 3 and 5 that the free-motion range of the rotor and shaft is but a few degrees, wherefore the rotor remains in closely restricted phase with the usual load-driving gear train for added advantage in rotor self-starting. Nevertheless, while this free-motion range is very small, the rotor will on its pass within this range in the final starting phase, for example to the extent in FIG. 4 and even to a lesser extent, assuredly reach in-phase and magnetic lock-in relation with a stepping magnetic circuit in the field so that at either end of its free-motion range, as in FIG. 5 on a self-start of the rotor in the exemplary direction of arrow 66, the rotor has entirely adequate running torque to pick-up and drive the entire motor load directly and positively, i.e., without further participation of the coupling spring which then serves merely as a solid link connection between the rotor and shaft.

To demonstrate the preferred small size and high resiliency of a coupling spring, as well as the equally small free-motion range between rotor and shaft, at which a rotor will reliably self-start under a maximum designated load, the following data are given by way of example only and without any intended limitation. Thus, in a motor with a rotor of approximately .750" diameter, the spring anchor post 58 (FIG. 3) was .075" in diameter and .030" in height, and the spring 50 had somewhat over 8 turns of an inside diameter of roughly .065", with the spring having been wound from spring wire of approximately .006" diameter. The active length 60 of the spring was approximately .070" and contained roughly 5 turns, and the shank extension 62 on the spring anchor post was approximately .050" in diameter, wherefore the exemplary free-motion range was approximately .015".

The spring coupling 38 is also exceedingly simple in construction and readily lends itself to highly efficient and low-cost mass production, yet will perform its designated function accurately and reliably for the longest time. Thus, the coupling spring, being of very small size and readily wound and cut-off in a fully automatic machine, is of negligible cost. Also of very low cost is the coupling element 40 with its hub and disc parts 42 and 52 and post 58 and shank extension 62 thereon, with this element 40 being advantageously a molded part, preferably plastic, even having molded therein the central recess 70 for reception of this part on the shaft 36 with a sufficiently tight fit for its secure mount thereon. This molded part 40 preferably also has an extra post 58' and shank extension 62' which, while not used in connection with a coupling spring, will provide for dynamic balance of the part 40, with the extra shank extension 62' projecting into an extra recess 54' in the rotor 14 so that the latter is also dynamically balanced. Advantageously, the molded part 40, rotor 14 and coupling spring 50 are preassembled as a unit 72, with the rotor-retaining shoulder 46 on the part 40 being provided simply and conveniently by a staking operation. Once this unit is assembled, the free-motion range of the rotor is established and permanently maintained and the coupling spring is locked-in between the parts 40 and 14. For added secureness of the spring mount on the post 58, especially against axial stripping from the latter from any cause prior to assembly of the unit, the post 58 is preferably provided at its free end with an outwardly projecting lip 74 which serves as an effective restraining shoulder to that end. Also, the coupling spring 50 is preferably wound so that its turns are in engagement, whereby the spring may be made from fine-gauge wire of high resiliency, yet have adequate strength to recover from deflection on a motor stop and back the rotor from the motor load and into midway position of its free-motion range (FIG. 3), and the mount of the spring on its post is also of optimum firmness. The molded part 40 preferably also includes a pinion 76 which is adapted to drive the motor load directly or through a gear train.

While in the described rotor-to-shaft spring coupling 38 of the motor 10 the active spring length 60, and more particularly its end turn 64, participates in establishing the free-motion range between rotor and shaft, FIG. 5A shows a modified rotor-to-shaft spring coupling 38a in which the free-motion range between rotor and shaft is established by the rotor recess 54a and shank extension 62a and without participation by the active spring length 60a. To this end, the shank extension 62a is at its end provided with a collar formation 78 which at maximum operational deflection of the spring length 60a is engaged by the recess wall 56a on either side thereof to define either end of the free-motion range. Also, instead of forming the spring-anchor post 58 cylindrical as in FIGS. 3 to 5, the same may be frusto-conical as at 58b in FIG. 6 for a mount of the spring 50b thereon which is as secure as the mount of the spring 50 on the cylindrical post 58 with its lip 74. The shank extension 62b on the spring anchor post 58b is in this instance also frusto-conical.

Reference is now had to FIG. 7 which shows the adaptation of the featured spring coupling to a motor 10c that may in all respects be like the described motor 10, except that the present motor 10c has provisions for axial starting vibration of the rotor 14c. To the latter end, the rotor 14c is not only turnable on the hub part 42c of the coupling element 40c, but is also axially shiftable thereon, and there is provided a spring 80 which is seated in an annular pocket formation 82 of the coupling element and normally urges the rotor 14c against the top shoulder 46c on this element. The coupling element 40c may in this instance be journalled on a dead shaft 84 on the center core 20c. The spring coupling 38c as such may be like the described spring coupling 38 of FIG. 2, except that the end turn 64c of the active length of the coupling spring 50c is out of engagement with the wall 56c of the rotor recess 54c when the rotor is spring-urged into engagement with the shoulder 46c at which the rotor is out of full axial register with the field poles 30c and 32c. However, and as shown in FIG. 7, the endmost turn 64c of the coupling spring and the shank extension on the spring anchor post (not shown) project within the axial confines of the rotor recess 54c when the rotor 14c is in its uppermost position, i.e., in the position shown in which it is out of full axial register with the field poles 30c and 32c, wherefore even then the rotor recess 54c, spring end turn 64c and the shank extension therein define a free-motion range beyond which the rotor may not turn relative to the coupling element 40c.

For a start of the present motor 10c after a stop thereof, the field coil 28c is energized, with the result that the polar magnetic forces and the spring 80 initially cooperate to vibrate the rotor 14c axially into and from substantially full register with the field poles 30c and 32c substantially at the frequency of the applied current, with the rotor 14c being in its substantially full axial register with the field poles in the same relation to the latter as the rotor 14 to the field poles 30 and 32 in FIG. 2. In this initial axial-vibration starting phase of the rotor 14c the latter will also respond to the polar magnetic forces in additional vibration about its axis, with this combined rotor vibration axially and about its axis having a powerful starting effect of wedge-like urgency on the rotor, with the result that the latter will soon take off against an even exceptionally heavy load. The coupling spring 50c may be arranged so that its end turn 64c will remain just barely out of engagement with the rotor recess wall 56c during such axial starting vibration of the rotor, but will engage this recess wall when the rotor starts to turn and no longer vibrates axially under the urgency of the polar magnetic forces which then also magnetically lock the rotor in substantially full axial, i.e., normal running, register with the field poles and overpower the spring 80 in its urgency to hold the rotor out of full axial register with the field poles. In that case, the spring coupling 38c will perform as described earlier once the rotor is in normal axial running register with the field poles, including its participation in defining the free-motion range between rotor and shaft. It is, however, much preferred to arrange the coupling spring 50c so that its end turn 64c will on each inward stroke of the rotor in its axial starting vibration be within reach of the rotor, whereby the rotor will then have bouncing impacts with this spring with resulting edging of the rotor with particular urgency into angular displacement, for these rotor impacts with the spring will almost invariably occur on one side or the other of the conical wall 56c of the rotor recess 54c owing to the helix of the end turn 64c of this spring and the rotor's freedom to turn in either direction within the free-motion range when out of engagement with the spring in axial starting vibration. The spring coupling 38c will thus perform its earlier described function in either case and additionally assist quite considerably in the rotor's self-start when the spring 50c is within bouncing reach of the rotor in its initial axial vibration, yet except for its bouncing impacts with the rotor in its axial starting vibration the spring is during axial rotor starting vibration physically separated from the rotor and, hence, in no wise hampers the fullest exertion of the axial starting vibration of the rotor.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a synchronous reaction motor, the combination with a field including field poles arranged circularly about a first axis, a coil acting when energized to excite said field, a shaft part journalled for rotation about said axis, and a permanent-magnet rotor part turnable on said shaft part and having poles of opposite polarities cooperating with said field poles, of a device providing for free relative rotary motion between said parts over a given angular range; and a resilient coupling between said parts providing a helical spring carried by one of said parts with its axis spaced from and parallel to said first axis and having a free length to one end thereof, and spaced shoulders on the other part between which said spring length extends and by which it is deflected transversely of said first axis on relative rotation between said parts in either direction within said free-motion range.

2. In a synchronous reaction motor, the combination with a field including field poles arranged circularly about a first axis, a coil acting when energized to excite said field, a shaft journalled for rotation about said axis, and a permanent-magnet rotor turnable on said shaft and having poles of opposite polarities cooperating with said field poles, of a device providing for free relative rotation between said rotor and shaft over a given angular range; and a resilient coupling between said rotor and shaft providing an arm fast on said shaft, a helical spring carried by said arm with its axis spaced from and parallel to said first axis and having a free length to one end thereof, and spaced shoulders on said rotor between which said spring length extends and by which it is deflected transversely of said first axis on relative rotation between said rotor and shaft in either direction within said free-motion range.

3. The combination in a synchronous reaction motor as in claim 2, in which said arm has a projecting post coaxial with said spring and of cross-sectional size to receive and endlength of said spring in tight surrounding engagement for its mounting thereon, which said free spring length projecting from said post.

4. The combination in a synchronous reaction motor as in claim 2, in which said arm has a stud coaxial with said spring and extending between said shoulders as well as within said spring length with clearance therefrom and from said shoulders with said shoulders and stud constituting said device.

5. The combination in a synchronous reaction motor as in claim 4, in which said stud extends substantially to said one spring end, said spring length is received substantially fittingly between said shoulders, and said shoulders, stud and spring length constitute said device, with said free-motion range being substantially equal to said clearance.

6. The combination in a synchronous reaction motor as in claim 2, in which said shoulders are formed by a recess in said rotor.

7. The combination in a synchronous reaction motor as in claim 6, in which said recess has a frusto-conical wall, and the end turn of said spring length in said recess is in engagement with said wall, with said spring length being axially substantially relaxed.

8. The combination in a synchronous reaction motor as in claim 3, in which said post has a diametrically reduced shank extension coaxial with said spring and extending therebetween said shoulders as well as within said spring length with clearance therefrom and from said shoulders, with said shoulders and shank extension constituting said device.

9. The combination in a synchronous reaction motor as in claim 8, in which said shank extension extends substantially to said one spring end, said spring length is received substantially fittingly between said shoulders, and said shoulders, shank extension and spring length constitute said device, with said free-motion range being substantially equal to said clearance.

10. The combination in a synchronous reaction motor as in claim 9, in which said shoulders are formed by a recess in said rotor having a frusto-conical wall engaged by the endmost turn of said spring length in said recess, and said recess, shank extension and endmost spring turn constitute said device.

11. The combination in a synchronous reaction motor as in claim 2, in which said spring is cylindrical.

12. The combination in a synchronous reaction motor as in claim 2, in which successive turns of said spring are in engagement with each other.

13. The combination in a synchronous reaction motor as in claim 3, in which said post has at its end an outwardly projecting lip for added secureness of said spring on said post.

14. The combination in a synchronous reaction motor as in claim 3, in which said spring is substantially cylindrical, and said post is frusto-conical for added sureness of said spring on said post.

15. The combination in a synchronous reaction motor as in claim 2, in which said arm is a disc having spring anchor means and a central hub about said first axis and serving as said shaft, with said hub having a central recess, and there is further provided a shaft about said first axis on which said hub is mounted with its central recess.

16. The combination in a synchronous reaction motor as in claim 15, in which said disc with its spring anchor means and central hub is a molded plastic part.

17. The combination in a synchronous reaction motor as in claim 16, in which said molded part also has an integral pinion formation coaxial with said hub.

18. The combination in a synchronous reaction motor as in claim 2, in which said shoulders are tapered and said rotor is also axially movable on said shaft, and there is further provided a resilient member normally urging said rotor out of axial register but within magnetic reach of the field poles, with said member reacting, on coil re-energization after a rotor stop, with magnetic forces of said rotor and field poles to axially vibrate the nonstarted rotor in and from substantial axial register with the field poles, and said free spring length projecting between said shoulders in any axial position of said rotor and to such depths as to engage said shoulders only when said rotor is in substantial axial register with the field poles.

19. The combination in a synchronous reaction motor as in claim 18, in which the depthwise projection of said free spring length between said shoulders is further such that on axial vibration of said rotor into substantial axial alignment with the field poles either or both of said shoulders impact with said free spring length with ensuing angular displacement urgency of said rotor on its shaft.

20. The combination in a synchronous reaction motor as in claim 19, in which said spring is substantially cylindrical so that only the endmost helical turn thereof between said shoulders has operational engagement and impact with the latter.

References Cited

UNITED STATES PATENTS

| | | | |
|---|---|---|---|
| 2,633,950 | 4/1953 | Phaneuf | 310—41 X |
| 3,204,137 | 8/1965 | Gardes et al. | 310—164 |
| 3,333,129 | 7/1967 | Kohlhagen | 310—164 |

MILTON O. HIRSHFIELD, *Primary Examiner.*

WARREN E. RAY, *Assistant Examiner.*